United States Patent [19]
Brindle et al.

[11] Patent Number: 5,493,635
[45] Date of Patent: Feb. 20, 1996

[54] SYSTEM FOR COMBINING HETEROGENEOUS IMAGE PROCESSING JOBS INTO A SINGLE JOB

[75] Inventors: Edward E. Brindle; John C. Czudak, both of Webster; David B. Mensing, Hilton, all of N.Y.

[73] Assignee: Xerox Corporation, Stamford, Conn.

[21] Appl. No.: 259,704

[22] Filed: Jun. 14, 1994

[51] Int. Cl.⁶ ........................................ G06F 3/12
[52] U.S. Cl. ............................. 395/114; 395/115
[58] Field of Search ............................ 395/114, 112, 395/115, 164, 116; 364/519, 419; 346/157

[56] References Cited

U.S. PATENT DOCUMENTS

| | | | |
|---|---|---|---|
| 4,992,956 | 2/1991 | Kaku et al. | 364/519 |
| 5,107,423 | 4/1992 | Sasaki et al. | 364/419 |
| 5,150,455 | 9/1992 | Morikawa et al. | 395/114 |
| 5,226,112 | 7/1993 | Mensing et al. | 395/114 |
| 5,228,118 | 7/1993 | Sasaki | 395/112 |
| 5,276,780 | 1/1994 | Sugiura | 395/116 |
| 5,276,799 | 1/1994 | Riushin | 395/162 |
| 5,293,466 | 3/1994 | Bringmann | 395/114 |
| 5,303,342 | 4/1994 | Edge | 395/164 |
| 5,327,526 | 7/1994 | Nomura et al. | 395/115 |
| 5,349,647 | 9/1994 | Freiburg et al. | 395/115 |
| 5,351,074 | 9/1994 | Kadowaki et al. | 346/157 |

*Primary Examiner*—Raymond J. Bayerl
*Assistant Examiner*—Steven P. Sax
*Attorney, Agent, or Firm*—R. Hutter

[57] ABSTRACT

A method of combining data sets of heterogeneous image formats, such as PDL's, in a printing system. A first image data set is translated by a coprocessor, using an interpretation code among many stored in memory. In response to "end of job" data in the first image data set, the first image data set in a final image format is transferred to the memory, and a second image data set is transferred from the memory to the coprocessor. The image format of the second image data set is determined. An interpretation code for translating the second image data set is loaded into the coprocessor.

3 Claims, 5 Drawing Sheets

SYSTEM FOR COMBINING HETEROGENEOUS IMAGE PROCESSING JOBS INTO A SINGLE JOB

This application incorporates by reference U.S. Pat. No. 5,226,112, and U.S. patent application 08/052,498 filed Apr. 23, 1993, entitled "Apparatus and Method for Determining the Page Description Language in which a Print Job is Written," both assigned to the assignee hereof.

The present invention relates generally to interpreting jobs written in a plurality of page description languages for printing with a printing apparatus, and more particularly to a technique for facilitating the printing of jobs which combine images which are in heterogeneous page description languages or image formats.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser printers which have limited functions and features such as a limited tray capacity which restricts the number and types of copy sheets that can be used to make prints on, or which do not have a finishing capability, etc. More importantly small laser printers also typically handle only one page description language.

On the other hand, larger high speed laser printers normally have a great deal of finishing and copy sheet capability which would allow the PC user to have, for example, custom printing and finishing of his work product, an option which for many PC users would be desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different page description languages (PDLs), which are directed to specific printer devices.

In addition to the well-known commercially-available PDLs such as PostScript and HP-PCL, which relate mainly to the construction of various typefaces, there are other conventions for organizing image data independent of any type faces therein. These "image formats" include TIFF, CALS, as well as those image formats which are associated with facsimile transmission, such as CCITT fax Group 3 and fax Group 4. Image formats are generally used as a system of "shorthand" commands which enable raw image data (i.e., a set of binary numbers corresponding to write-black and write-white pixels) to be compressed into a more manageable form. To take one basic example, an image format such as TIFF or CALS may include, within a data set, an instruction corresponding to "print a white line" in lieu of a long string of numbers (such as zeros), each number corresponding to one individual pixel in the white line. In this way, image data may be retained in smaller memory spaces than would be required if every single pixel in an image had its own bit of memory. (As used in the claims herein, the term "image data" shall apply to image data in either image format or PDL, and an "image data set" shall mean a meaningful quantity of such data, such as data for an image or a connected series of images.)

With any PDL or image format, there will inevitably be a step of "translation" of the PDL or image format data into a form usable by an output device, such as a laser printer. Printing hardware requires a stream of binary data to be input into it. Thus, the instructions within the image format, such as to "print a white line," will eventually have to be translated into the actual binary code so that, for example, this code can be applied to the modulation of a laser source in a raster output scanner, or applied sequentially to individual ejectors in an ink-jet printer.

The patent incorporated herein by reference, U.S. Pat. No. 5,226,112, discloses what is generally described as a system for translating data information from one PDL to another PDL, but the basic principle therein can be applied to translating image data directly into the binary code for operating an output device. As described in the patent, the system includes a "server" which includes a host processor and an "accelerator coprocessor," or ACP. The host processor serves as the main interface between the input data (which is in a PDL or image format) and the output of data to a decomposer or directly to an output device. The host periodically addresses the ACP, which is an independent microprocessor, with the dedicated function of performing the translation from one data form to another, particularly from one PDL to another or from one PDL to image data directly usable by the printing hardware. When a job of a particular PDL or image format enters the server, the host processor sends the untranslated data to the ACP, along with the necessary interpretation code for translating the data. Typically, the various interpretation codes for translating various PDLs or image formats are retained on a separate disk memory and retrieved by the host as needed for a particular job. Once the ACP has both the data to be translated and the suitable interpretation code, the translation process is carried out by the ACP otherwise independently of the host. Only when the translation job is finished does the ACP send back the translated data to the host, which in turn sends it on to subsequent stages in the image-processing system.

In a practical system, particularly a system in which a variety of data bases may be accessed, or in which a large number of users share a common body of information, it may occasionally be desirable to use the server to print documents which have been created from various sections derived from various sources. For example, if one wished to assemble a book in which different chapters were written by different authors, and particularly if the different authors each used his or her own personal computer system to write the chapter, one may be in a situation in which the various pieces of the desired document are in different PDLs. However, even though each separate piece of the document may be printed using its own PDL, if the desired book is to be bound a high volume output device, it would be convenient, and in some cases necessary, that the various heterogeneous pieces of the job be combined first into a single job, which is then sent in one piece to the output hardware.

In accordance with the present invention, there is provided a method of combining data sets of heterogeneous image formats in a printing system comprising a coprocessor adapted to translate image data according to an interpretation code, a memory for storing a plurality of interpretation codes and image data, and a guesser for determining an image format of a sample of image data. A first image data set is translated. In response to translating "end of job" data in the first image data set, the first image data set in a final image format is transferred to the memory, and a second image data set is transferred from the memory to the coprocessor. The image format of the second image data set is determined. An interpretation code for translating the second image data set is loaded into the coprocessor.

Figure 1:
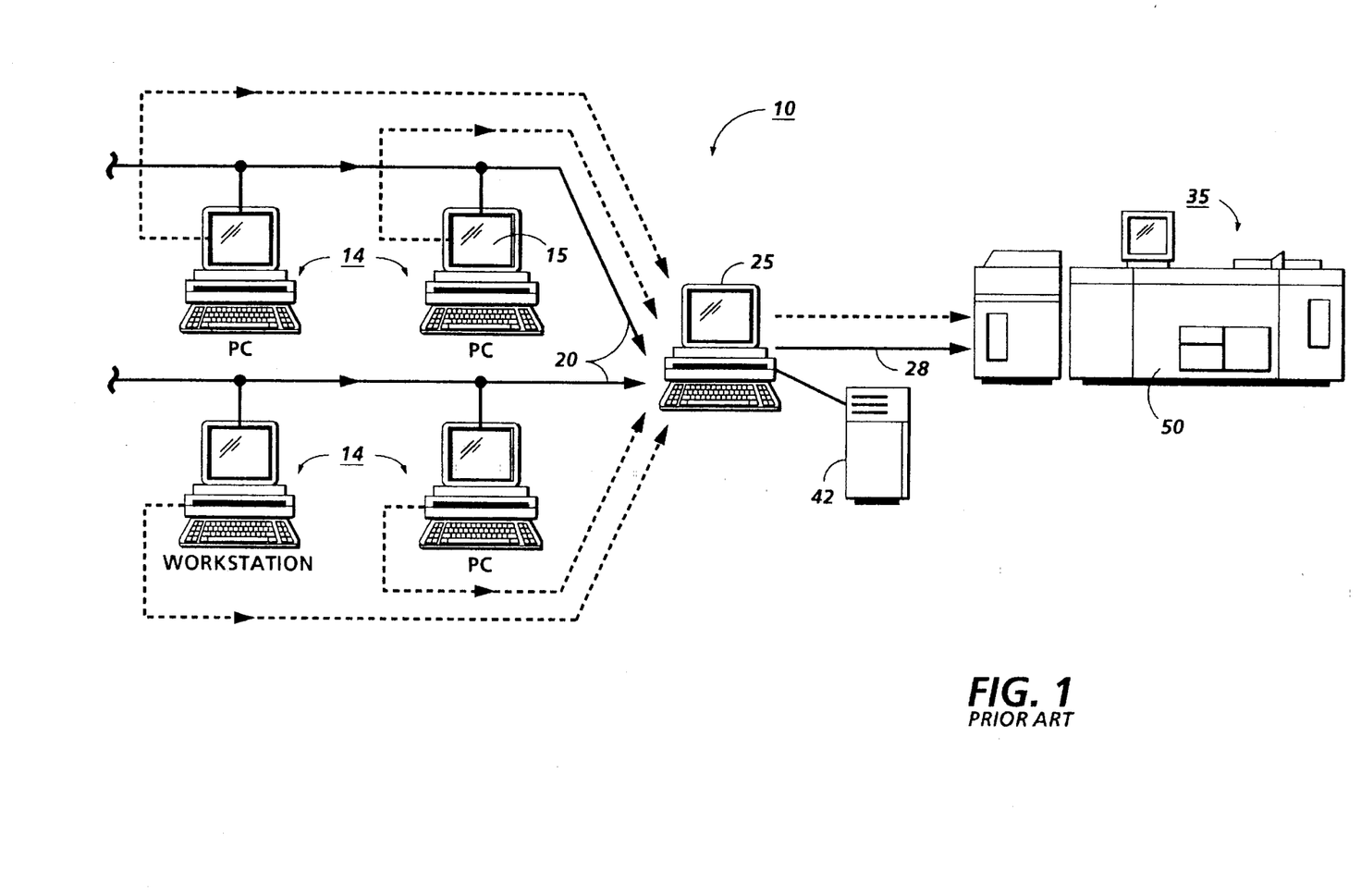
FIG. 1 is a schematic view of a printing arrangement including a plurality of client workstations interfaced with a printing apparatus by a server.

Referring to FIG. 1, there is shown a printing arrangement, designated generally by the numeral 10. The printing arrangement 10 includes a plurality of remote inputs such as PC:s, workstations, etc. (referred to herein as workstations 14), coupled via one or more networks 20 to a server 25. Workstations 14 include a CRT type display screen 15 together with keyboard and mouse for entering programming instructions, image data, etc. Screen 15, which may be a touchscreen, displays various job program choices, operator instructions, messages, etc. The server 25 is, in turn, coupled through one or more networks 28 to one or more printing systems 35. While separate networks 20, 28 are shown, a single network may instead be used.

Figure 2:
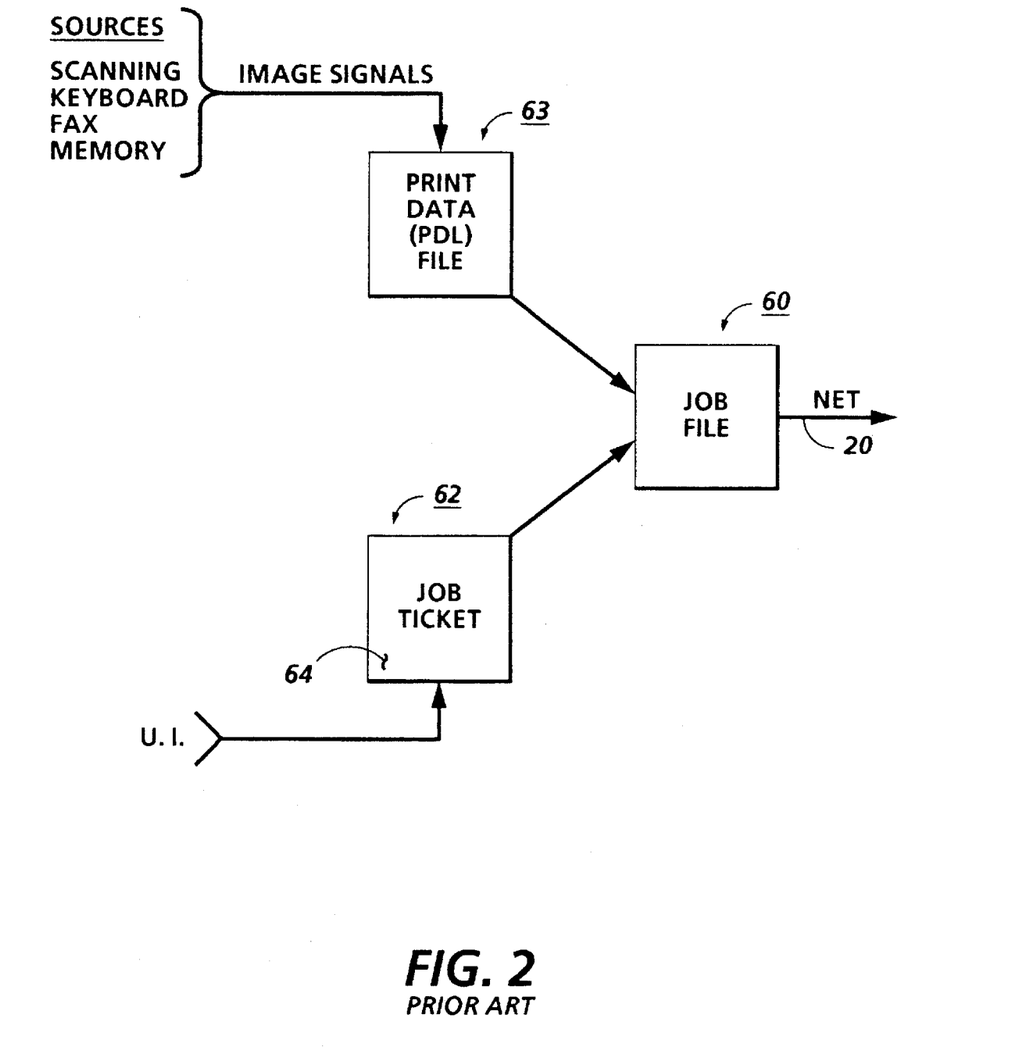
FIG. 2 is a schematic view of a job file and the contents thereof.

Referring to FIG. 2, electronic job files 60, or parts thereof, are created at the individual workstations 14, each job file being comprised of a Job Specification 62 and Print Data file 63 expressed in a PDL. Job Specification 62 is in the form of a job ticket 64 having instructions for routing, handling, and processing the job 62. As will be clarified from the discussion below, in the preferred embodiment of the present invention, the print data file 63 is typically written in either Postscript® ("PS") or Hewlett Packard Printer Control Language ("HP-PCL"). The jobs in Print Data file 63 are electronic in form, consisting of image signals or pixels generated, for example, by scanning hard copy documents and converting the document images to image signals or pixels, directly by a keyboard, taken from memory, or consisting of page format and/or graphic output commands all encoded in one of the preferred PDL encodings. The content of the job files are normally compressed to increase bandwidth and reduce the amount of storage required. The image signals, pixels or PDL instructions in Print Data File 63 are arranged as electronic documents or pages for printing on a print media such as paper stock or sheets.

The programming instructions in the job ticket 64 accompanying the job file 60 may include selection of the printer in the case where plural printers are available for the client or user to choose from in printing system 35. Where a printing system 35 has printers with different features, functions, speeds, etc., it may be necessary that the client select the printer that is to be used initially so that a job ticket 64 with the program selections available with that printer may be displayed at the client's workstation 14. During the printing process, the server 25 transmits the printing instructions from the job ticket 64 to the printing system selected.

A job ticket 64 comprises a series of electronic program instructions for processing a job. Normally, job ticket 64 consists of an electronic format having various programming choices displayed on screen 15 of the workstation 14 being used to create the job. The client at the workstation interactively fills out the job ticket by making selections electronically using the workstation mouse, keyboard, etc. It should be recognized that the job ticket instructions encompass not only print programming instructions for the job itself but also routing and handling instructions for the server 25. The completed job ticket 64 is combined with the job in Print Data file 63 in the job file 60.

The server 25 comprises any suitable interface for receiving job files 60 from workstations via network 20, with the ability to access and decode the job processing instructions on the accompanying job ticket. The server 25 preferably includes an on-board memory of suitable capacity for temporarily storing the job files pending processing thereof by printing system 35. The print manager on-board memory may be large enough to support long term storage of the job files or parts of the job files. Alternately, one or more remote memories 42 may be provided for this purpose. The printing system 35 may include one or more high speed electronic printers 50 for processing jobs in accordance with the instructions input through the job ticket accompanying each job file. While a single printer 50 is shown, plural printers, either at a single central location or at several remote locations may be envisioned. In contemplated implementations of the preferred embodiment, the printer 50 could comprise printer types such as laser ROS imaging, ink jet, ionographic, LED, and the like.

Figure 3:
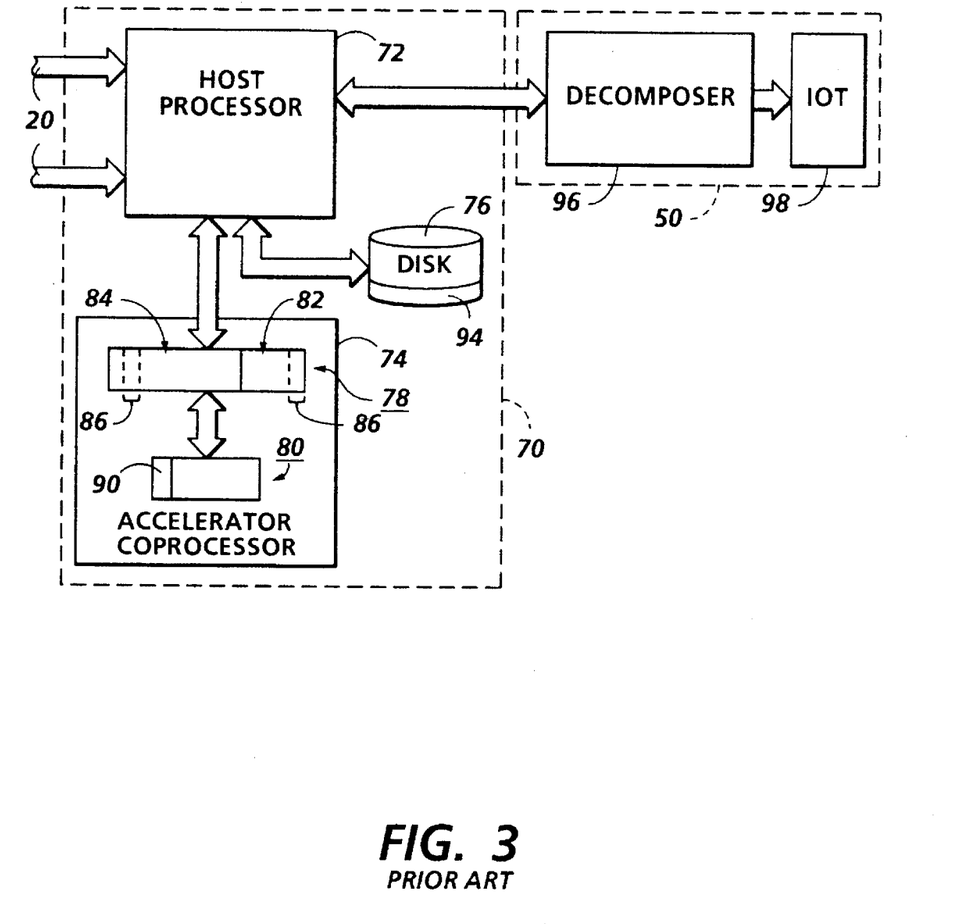
FIG. 3 is a schematic, block diagramatic view of the server and the printing apparatus used to implement the technique of the present invention.

Referring to FIG. 3, the structure of the server 25 and the printing system 35 is discussed in further detail. In the preferred embodiment of the invention, a swapping technique is achieved with an arrangement that is designated by the numeral 70. The arrangement includes a host processor 72, an accelerator coprocessor (ACP) card 74 and a disk storage device 76. In one example, the host processor is an IBM PC-AT system having an Industry Standard Architecture (ISA) or an Extended Industry Standard Architecture (EISA) bus to accept the ACP card. The host processor 72 can be configured for operation in a network environment.

The host processor 72 is capable of transferring data to and from ACP memory through a 128K byte sliding shared memory window. The ACP 74 also can use a small section of the host processor's IO address space. By writing to an IO data port of the ACP 74, the host processor 72 is able to send commands to the ACP 74. In turn, by reading the IO data port, the host processor 72 is able to receive acknowledgement messages back from the ACP 74. These messages are typically 1 byte in length and are used to synchronize the actual data transfers in shared memory. In the preferred embodiment, two 8 bit data ports are used to communicate synchronizing swap requests and acknowledgements between the ACP 74 and the host processor 72 prior to the actual transfer of PDL decomposer code and font cache data. These two ports are referred to as: the Host to Processor and Processor to Host Data Registers ("HPDR" and "PHDR").

Referring still to FIG. 3, the ACP card 74 is shown with a memory map 78, which includes all of the software necessary to interpret a page description language, and the 80960CA microprocessor, the microprocessor being designated by the numeral 80. Referring to FIG. 5, the memory map 78, which includes a user section 82 and a system section 84, is shown in greater detail. The memory map 78 further includes a section 86 having registers through which the HPDR and the PHDR can communicate and a status flag can be set. The user section 82 comprises a section for retaining PDL interpretation code, the PDL interpretation code being adapted to facilitate the interpretation of a job file expressed in a first PDL, such as PS or HP-PCL.

It should be appreciated that only selected portions of the system section 84 are shown. Much of the software for the section 84 simply serves as one of various approaches for implementing the processes illustrated in the patent incorporated by reference. It will be recognized by those skilled in the art that, in practice, various software tools, such as tables, e.g., fault, system procedure and control tables, timers and controls therefor, control implementations, storage locations, and stacks, typically would be employed in the implementation of the system section 84.

The microprocessor 80 includes a section 90 which contains information regarding the internal state of the microprocessor 80, such information including 1K memory, registers and states. This information selectively can be stored in a layer 92 of the system section 84. The host processor 72 is coupled with the disk drive device 76 so that, as explained in further detail below, portions of the memory map 78 can be transferred, in the form of a context file, thereto. Preferably, at any one moment, one or more PDL context files, designated by the numeral 94, are stored in the disk drive 76. Upon processing a job file 60, the interpreted (translated) PDL file can be transmitted to one of a plurality of output or printing devices. In one embodiment, the interpreted PDL file is expressed in Interpress, and is transmitted to the printer 50 which comprises a decomposer 96 and an image output terminal (IOT) 98, which may be in the form of, for example, a laser printer or an ink-jet printer. In operating the printer, the interpreted output from the host processor 72 is transmitted to the decomposer 96 where it is decomposed into graphics and text for printing by the IOT 98. In another embodiment of the invention, it may be desirable to make translations of data directly from one type of PDL or image format, such as TIFF, directly into a bit stream, so that the data can be applied directly to the IOT 98 without the decomposer 96.

(As used in the claims herein, the phrase "image data format" is intended to apply to either a PDL or to an image data format, such as TIFF or a facsimile format, as required by a particular situation. Further, an image format may include ASCII characters, or the actual binary data which is applied directly to output hardware.)

Figure 4A:
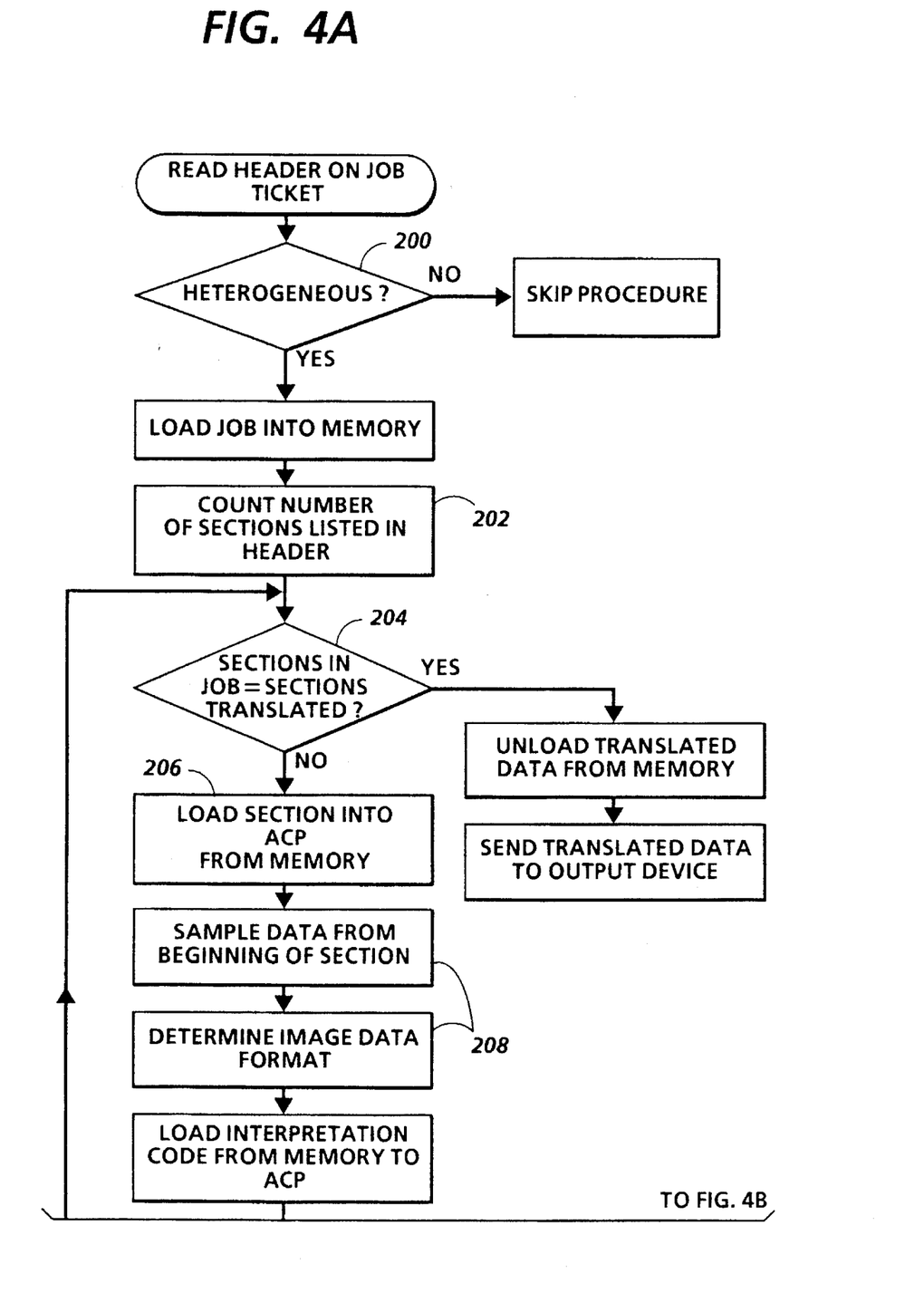
FIG. 4, which is divided into two sections 4A and 4B on two drawing sheets, is a flow diagram of a method carried out according to the present invention.
Figure 4B:
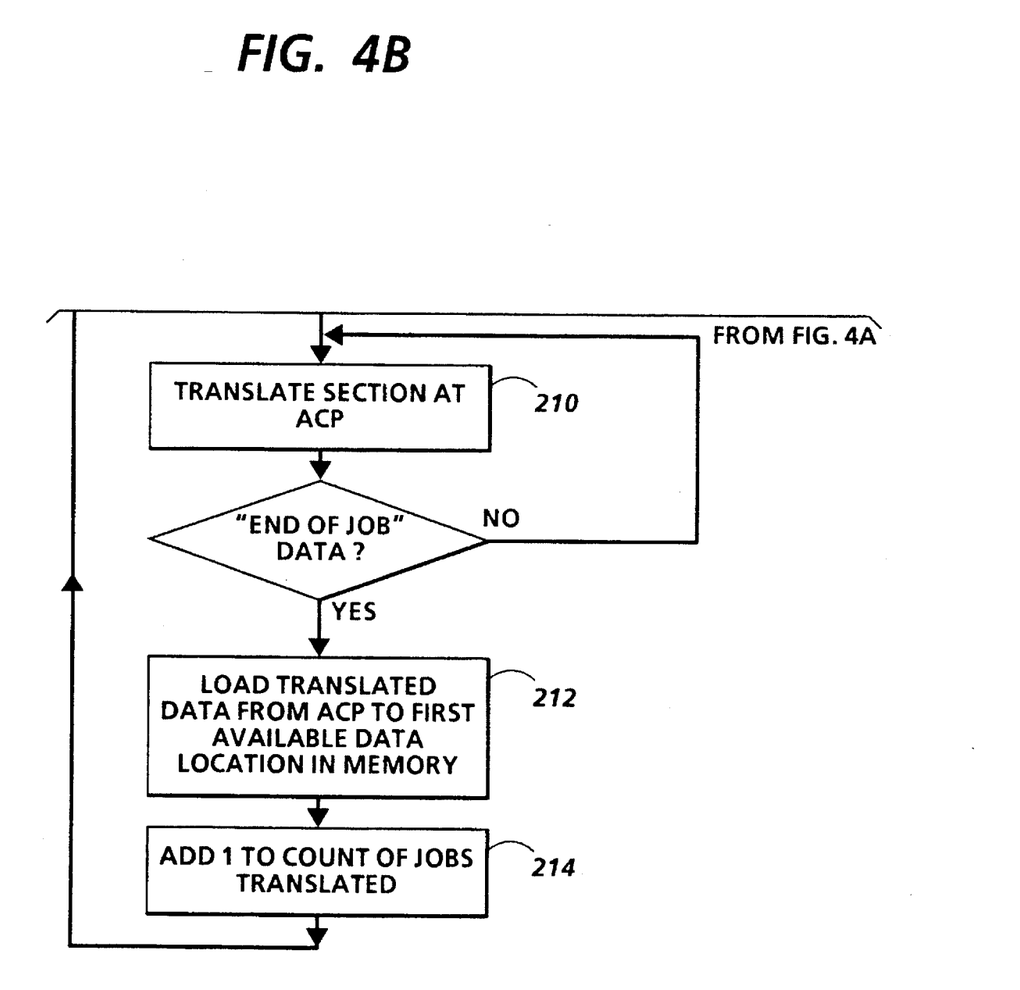

FIG. 4 is a flow diagram illustrating the steps by which the server 70 of the present invention performs the function of translating a job comprising sections of heterogeneous image data formats and combines them into a single set of image data which can be sent in one piece to a printer 50.

According to one embodiment of the present invention, which is used in conjunction with the DocuTech system, each job which is sent to be printed will include a job ticket (such as job ticket 64, mentioned above) at the head thereof, which will provide any number of general instructions for handling the bulk of the data in the job. For example, such a job ticket may include instructions to print the images of the data in a "signature" form, for binding in a booklet, or to print the data on a particular type of paper which is available to the output hardware. In this particular instance, the job ticket includes a few lines of instructions, typically in ASCII characters, which indicates to the system that the incoming image data to be printed comprises a plurality of sections, which may be of heterogeneous data formats (either different PDLs or different image formats). Thus, the first determination made by server 70 (and preferably, although not necessarily, within the host processor 72) is to check the job ticket and see if the incoming data is intended to be heterogeneous, as shown at the decision branch marked 200. If there is no indication that the incoming job is heterogeneous, the entire procedure can, of course, be skipped, and the incoming data processed in the normal fashion described, for example, in the patent incorporated herein by reference.

If, however, the job ticket indicates that the job is heterogeneous, the following steps are taken. First, the entire job is loaded into the memory which is embodied by disk drive device 76. As described in the referenced patent, this disk drive 76 may include, at specific locations therein, sections for retaining a plurality of interpretation codes for interpreting various PDLs or image formats as necessary, and also space for retaining both untranslated and translated image data.

For reasons which will become apparent in detail below, it will typically be necessary for the server 70 to know how many sections comprise the heterogeneous job so that the server will know when the job is completed. To this end server 70, preferably within host processor 72, may maintain a system for counting the number of sections which are listed in the job and comparing this count to how many sections have been translated at a given time. When these two numbers equal, the system will stop the translation function and go on to the downloading function, as will be described below. This comparison is shown at the decision branch 204.

As described at the referenced patent, server 70 includes therein an accelerator co-processor (ACP) 74 generally dedicated to the function of performing translation; deciding which data is entered into the ACP 74 and how it is translated is generally the function of the host processor 72. According to the present invention, the host processor 72 begins the translation process by loading into ACP 74 the first section of data (indicated in the claims as a "data set") to be translated. Depending on the specific architecture of the queing or other systems in the server 70, the different sections in a job may be placed within memory 76 contiguously in a single memory space, or conceivably could be loaded into the disk drive 76 in a hierarchical manner, in which the different sections are each assigned to different specific locations within the disk drive 76 for retrieval. In either case, the first section is loaded into ACP 74, where it is translated in a manner described, for example, in the referenced patent. In the case where individual sections within the job are taken from the disk drive 76, the host processor 72 will have an indication when to stop loading image data from the disk drive 76 into ACP 74, when there is no more image data at a particular image location. In the case where the various data sets forming different sections are loaded in one "clump" at one location in disk drive 76, there may be a necessity to determine where data for one section ends and the data for the next section begins. One possible way of doing this is to provide the host processor 72 with code sensitive to an "end of job" command within the data being loaded from the disk drive 76 into ACP 74. When the "end of job" command is detected within the image data during the loading step (the loading step being indicated as 206 in FIG. 4) the host processor 72 will have an indication that the particular section has been fully loaded into ACP 74, and to stop the loading process.

Another important consideration in the translation system is determining the original image data format of the data to be translated. The original image data format of the data to be translated, of course, determines which interpretation code is taken from disk drive 76 and used to translate the data on ACP 74. There are, broadly speaking, two ways to make this determination: either explicitly, by an instruction inherent to the image data, or by a "guesser." In the DocuTech-based embodiment of the present invention, a provision is made, at the time the user creates the job, to ask the user what PDL a particular section of the job is in, and this information may be provided by the user in the job ticket. Alternately, a system could be contrived wherein the PDL of particular data could be tied to the source of the data, e.g., an arrangement could be made within host processor 72 to identify "if the data comes from terminal X on the network, it must be in PostScript," etc.

Many types of PDLs, particularly Interpress and some versions of PostScript, announce themselves by a specific instruction at the beginning of each job. Alternately, many straightforward techniques for guessing the PDL based on the actual data are known. For example, different common types of PDLs will have unique instructions which act as tell-tales and indicate to the host processor what language they are in, without requiring that the host processor perform any actual translation. For example, comment lines in PostScript data include a unique character combination of %! (known as a "percent-bang"). As the probability of such a combination of characters occurring incidental to image data is very remote, and because this combination of symbols is common in PostScript, the host could be made sensitive to this particular combination of characters to guess that the language of the data is PostScript. Similarly, image formats may include tell-tales as well; data in the TIFF image format typically begins with opening characters of MM or II (indicating, respectively, the source of the code as Motorola or Intel). Many other types of guessing techniques may be apparent to one of skill in the art, and others are also described in detail in the patent application incorporated by reference.

In order to carry out this guessing at the host processor 72, the data being transferred from the disk 76 through the host 72 and into ACP 74 may be submitted, at the host processor 72, to a set of analysis queries; these queries can be considered a "guesser" for purposes of the claims. For example, the first line of the instruction could be polled for tell-tales of Interpress, PostScript, or TIFF; a larger sample of the data could further be polled for more subtle tell-tales, such as the %!. This general technique of sampling a portion of the image data and determining therefrom the necessary interpretation code for translating it is shown generally as the boxes marked as 208 in FIG. 4. Once the most likely PDL or image format for the data is determined, the necessary interpretation code is also retrieved by the host processor 72 from disk drive 76, where it is loaded into section 82 of memory 78 of ACP 74. The data into ACP 74 is then translated according to the method described in the patent incorporated by reference. This translation is shown in the flowchart of FIG. 4 as instruction 210.

When ACP 74 performs the translation function, it must also be sensitive to data consistent with the end of a job being interpreted. As used in the claims herein, "end of job" data may be either an explicit instruction found within the data to be printed, or else some other indication inherent to the data being translated that the end of the job has been reached, such as simply running out of usable data, or the presence of error messages which may be consistent with the data being translated being of a different image data format than what is occurring in the translation. Indeed, within the host processor 72, end of job data for one job may simply be in the form of the beginning-of-job data in the next section of data. In any case, the ACP 74 preferably includes means responsive to such end of job data and which, in response to the end of job data, instructs the host processor to remove the translated data from memory map 78 in ACP 74, move that data to disk drive memory 76, and then prepare to translate the next section of data, which may be in another image data format. Therefore, in the system of the present invention, there is associated with the translating program within ACP 74 some instruction to, upon detecting end of job data in the data being translated, instruct the host processor 72 to remove the translated data from memory map 78 in ACP 74, and transmit it to disk 76, much in the manner described for the homogeneous case described in the patent incorporated by reference. This step is shown by instruction 212 in the flow diagram of FIG. 4.

Further, the end of job data detected in the translation of data in ACP 74 can also be used to trigger an incrementing of the count of the number of sections that have been translated within a job. Returning to decision branch 204 in the flowchart, the newly-incremented count of how many sections have been translated are compared to how many individual sections exist in the entire heterogeneous job, and if by this count all of the sections have been translated, the translation of the job is over.

As the data sets representing the successive sections of the job to be printed are translated, they are loaded into the memory in disk drive 76 and collected there until all of the sections have been translated. Whether the translated data is in the form of a PDL, such as Interpress, or substantially in binary form ready for direct application to an IOT, the intended effect of the accumulation of translated data in the memory is to create a single data set without any apparent "seams" between one section and the next. That is, the translated data should be in a form for sending to the printer 50 or IOT 98 in such a way that the disparate origins and original data formats of all of the sections are invisible. One possible technique for creating such a continuous or "seamless" output is to load the translated data from the first section to an origin point within the memory, and then, in the next cycle, to load the translated data from the second job starting at a point immediately following the end of the translated data for the first section. There may also be included, as needed, a "new page" instruction between the sections, but such an instruction would not be conspicuous as a division between two sections. Alternatively, if a hierarchical memory structure is used within disk drive 76, the different sections may be loaded onto distinct locations within the memory. At any rate, it is desirable that the final translated data should be in a form sendable to output hardware as one piece.

When all of the sections are translated, and the translated data set loaded into memory in disk drive 76, the entire package of translated data can then be printed out by hardware, as per instructions from the host processor 72. Once again, if the translated data is in the form of a common PDL such as Interpress, a decomposer such as 96 may be required to operate the hardware according to the Interpress instructions; or alternately, if the final translated data is in binary form, the bits can by sent more or less intact to a raster output scanner or ink-jet printer. These steps are shown as instructions 220 in the flowchart of FIG. 4.

It is possible, according to the present invention, to automate the translation process even further, by providing a system which would not require the "forewarning" of the job ticket to indicate that a heterogeneous job is being loaded into the server 70. For example, at the step shown as 206 in FIG. 4, when a data set corresponding to a section is loaded from the disk drive 76 into ACP 74 for translation, the host 72 can be sensitive to any end of job instruction, and automatically assume that any data after this end of job instruction, if it does not exhaust the data to be translated in disk 76, will require a redetermination of the image data format. In this way, a user assembling different documents from various sources into a single document to be printed would not have to pay attention to the PDLs for image formats of the data, and would not even have to tell the server 70 beforehand that a heterogeneous job is to be printed.

While the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

We claim:

1. In a printing system comprising a coprocessor adapted to translate image data according to an interpretation code, a memory for storing a plurality of interpretation codes and image data, and a guesser for determining an image format of a sample of image data, a method of combining data sets of heterogeneous image formats comprising the steps of:

translating a first image data set of one image format including "end of job" data;

in response to translating the "end of job" data in the first image data set, transferring the first image data set in a final image format to the memory, and transferring a second image data set of one image format from the memory to the coprocessor;

determining the image format of the second image data set;

loading to the coprocessor an interpretation code for translating the second image data set;

translating the second image data set including "end of job" data; and in response to translating the "end of job" data in the second image data set, transferring the second image data set in a final image format to the memory so that the translated second image data set becomes continuous with the translated first image data set in the memory.

2. The method of claim 1, further comprising the steps of:

receiving in the memory a heterogeneous print job comprising a plurality of data sets, the data sets being in different image formats;

transferring a first data set from the memory into the coprocessor;

determining the image format of the first image data set; and loading an interpretation code for translating the first image data set to the coprocessor.

3. The method of claim 2, wherein the heterogeneous print job comprises a job ticket including a list of data sets in the heterogeneous print job, and further comprising the steps of:

counting the number of data sets that have been translated by the coprocessor since the job was received; and in response to all of the data sets in the heterogeneous print job being translated, unloading the translated data sets from the memory.

* * * * *